Aug. 24, 1948.  C. A. AKERT  2,447,624
INDICATOR MOUNTING BRACKET
Filed Dec. 4, 1944
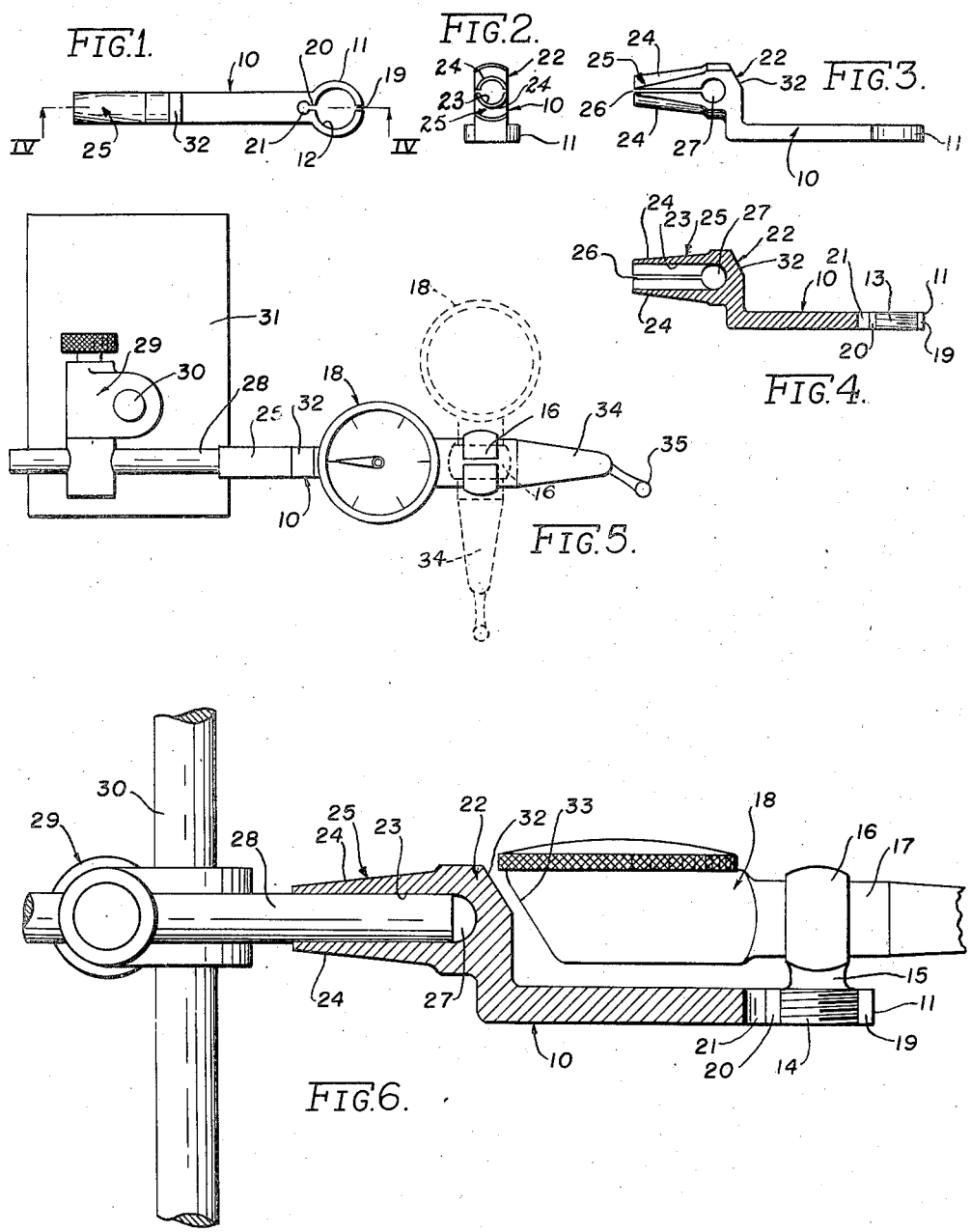
INVENTOR.
CARL A. AKERT.
BY Harry C. Lebovitz
ATTORNEY.

Patented Aug. 24, 1948

2,447,624

UNITED STATES PATENT OFFICE 2,447,624

INDICATOR MOUNTING BRACKET

Carl A. Akert, Chicago, Ill.

Application December 4, 1944, Serial No. 566,569

8 Claims. (Cl. 248—124)

This invention relates to mounting brackets and more particularly to improvements in indicator mounting brackets, although certain features thereof may be employed with equal advantage for other purposes.

It contemplates more especially the provision of a simple, compact, and adjustable bracket mount that can be interposed between a sensitive measuring indicator and a support therefor for rendering the indicator more accessible to restricted location in a variety of angular positions to more effectively perform its intended purpose.

Numerous types of indicator mounting brackets have heretofore been proposed, but these do not lend themselves to standard adaptations for adjustable indicator support nor promote accessibility of standard indicators for fully effective use in measuring in highly restricted locations. Indicators are utilized for precision work and primarily in tool making where tolerances are exceedingly small and accessibility to parts thereof is often difficult. Precision measurement is important in tool making so that greater measurement accessibility is desirable. With an indicator bracket mount constructed in accordance with the teachings of the present invention, a sensitive indicator can be rendered accessible in a variety of positions without the mount obstructing the use thereof in restricted locations. This is accomplished by providing a compact and simple mount which is less restrictive as to size than the indicator itself, and permits the latter's use at any angular or rotary position with or relative to the mount as well as transversely thereto within a complete circle of relative movements.

One object of the present invention is to simplify the construction and improve the operations of devices of the character mentioned.

Another object is to provide a simple indicator mount that is capable of substantially axial alignment with the indicator to provide for the complete rotary support in any adjusted position.

Still another object is to provide a simple and compact indicator mount having an offset to accommodate the indicator therein and to effect the support thereof in both longitudinal and transverse relation.

A further object is to provide a simple and compact indicator mount having an offset to accommodate the indicator therein and to effect the support thereof in both longitudinal and transverse relation with complete rotary adjustment in all positions.

A still further object is to provide an offset integral indicator mounting bracket with complete rotary attachment at both ends so that a complete range of adjustment between the indicator and mount is possible in both longitudinal and transverse relation.

Still a further object is to provide an indicator offset mounting bracket having a split resilient connection at both ends thereof to render such readily interposable between the indicator and the fixed support to insure maximum accessibility of the indicator to the parts to be measured.

Other objects and advantages will appear from the following description of an illustrative embodiment of the present invention.

In the drawing:

Figure 1 is a plan view of an indicator mounting bracket embodying features of the present invention.

Figure 2 is a left end view in elevation of the device shown in Figure 1.

Figure 3 is a side view in elevation of the device shown in Figures 1 and 2.

Figure 4 is a sectional view in elevation taken substantially along line IV—IV of Figure 1.

Figure 5 is a plan view of the mounting bracket and associated parts including a standard indicator and the support therefor.

Figure 6 is a fragmentary side view in elevation of the structure shown in Figure 5 with the mounting bracket in section.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises a horizontally disposed elongated straight arm or shank 10 which is of substantially rectangular cross-section to terminate in an indicator attaching end. The indicator attaching end comprises, in this instance, a substantially circular extremity 11 in the plane thereof to provide a vertical bore 12 threaded as at 13 to receive a correspondingly threaded shank 14 comprising the lower extremity of a post 15 which has a split circular indicator shank receiving ring 16 at its upper end for frictional connection with the shank 17 of a standard measuring indicator 18.

The measuring indicator 18 is rotatable about its longitudinal axis in the frictional split supporting ring 16 of standard construction. The split indicator supporting ring 16 is rotatable about its vertical axis by reason of its threaded shank 14 connecting with the threaded vertical bore 12 in the bracket mount circular extremity 11. The circular extremity 11 on the indicator mounting shank 10 is slitted as at 19 in the outer region thereof preferably though not essentially along its longitudinal axis to provide a frictional threaded connection with the post shank 14. This frictional engagement is enhanced by another slit 20 that communicates with an aperture 21 provided in the connecting end of the shank 10, thereby establishing an effective frictional connection between the threads 13—14 of the mount end 11 and the indicator post 15 to maintain them in rotary adjusted relation.

The shank 10 of the bracket mount terminates at its other extremity in an upwardly offset head 22 which is integrally connected therewith to provide just sufficient space for the large head end of the indicator 18 (Figure 6). The mounting bracket head 22 extends upwardly for a distance within the limits presented by the largest depth of the indicator 18 so that the latter may be mounted in line with the longitudinal axis supporting line of the mounting bracket head 22.

In the present embodiment, this is effected by presenting an elongated horizontal bore 23 within fixed complemental resilient jaws 24 comprising a frusto-conical horizontal extension 25 on the head 22. The resilient jaws 24 are defined by cross-slits 26 milled or otherwise provided horizontally through the frusto-conical head extension 25 along the axis of the bore 23. The cross-slits 26 terminate in a transverse aperture 27 in the head 22 to increase the resiliency of the jaws 24. This provides for the necessary resiliency in the jaws 24 to frictionally engage a horizontal post or stud 28 adjustably carried in a standard bracket 29 which is vertically adjusted along a standard 30 anchored to a base 31, the parts 28, 29, 30, and 31 being of standard construction and part of a gauge or indicator mounting bracket that is usually used for measuring in conjunction with the indicator 18.

As shown, the head 22 of the bracket 10 is provided with a tapered surface 32 proximate to and corresponding in inclination within forward surface 33 of the standard indicator 18 so that there will be sufficient space for the full mounting movement thereof on the bracket mount 10 without the latter being larger in size than is otherwise necessary. The standard indicator 18 usually terminates in a tapered end 34 having a feeler finger or detent 35 pivoted thereto through a ratchet connection (not shown) so that the feeler 35 can be displaced at any angular position. This adjustment coupled with the ability to rotate the indicator 18 with its post 15 transversely of the bracket mount shank 10 (shown in dotted outline in Figure 5) as well as to all intermediate positions of adjustment between these limits coupled with the complete rotary adjustment of the bracket mount 10 and its rigid head 22 relative to the horizontal supporting stud 28, and the axial rotation of the indicator 18 itself within the split collar ring 16, affords a full combination of adjustments for the indicator 18 with the mount 10 or relative thereto for complete access without obstruction by the supporting brackets or arm 10.

It will be apparent that a very simple, compact, and inexpensive bracket mount has been provided which will afford a full range of universal adjustment for an indicator 18 or the like relative to its supporting standard 30 without providing any obstruction beyond the confines of the indicator 18 itself.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. An indicator mounting bracket comprising an elongated shank, an upstanding supporting head at one end of said elongated shank to define an offset disposed in parallel spaced relation to said elongated shank for accommodating an indicator casing, and engaging means on said head and shank extremity to enable support of said shank and an indicator in a variety of rotary and angular positions.

2. An indicator mounting bracket, comprising an elongated shank, an upstanding supporting head at one end of said elongated shank to define an offset disposed in parallel spaced relation to said elongated shank for accommodating an indicator casing laterally of said upstanding head and above said shank, and frictional engaging means on said head and shank extremity to enable support of said shank and an indicator in a variety of rotary and angular positions.

3. An indicator mounting bracket comprising an elongated shank, an upstanding supporting head at one end of said elongated shank to define an offset disposed in parallel spaced relation to said elongated shank for accommodating an indicator casing, and resilient fixed jaws serving as engaging means on said head and shank extremity to enable support of said shank and an indicator in a variety of angular positions.

4. An indicator mounting bracket comprising an elongated shank, an upstanding supporting head at one end of said elongated shank to define an offset disposed in parallel spaced relation to said elongated shank for accommodating an indicator casing, resilient fixed jaws serving as engaging means on said head and shank extremity to enable support of said shank and an indicator in a variety of angular positions, said resilient fixed jaws at said elongated shank extremity being threaded, an indicator post threadedly engaging said threaded fixed jaws on said shank, and a frictional connector on said post for rotatively supporting an indicator in a variety of rotary positions.

5. An indicator mounting bracket comprising an elongated straight shank, an offset supporting head on one extremity of said shank to define an indicator casing accommodating offset disposed in parallel spaced relation to said elongated shank, confronting resilient fixed jaws on said head to extend substantially parallel to said elongated straight shank, said resilient fixed jaws being adapted to frictionally engage a horizontal stud to support said shank in a variety of rotative positions about the axis of said stud, and means at the other end of said elongated shank to support an indicator parallel to said shank.

6. An indicator mounting bracket comprising an elongated straight shank, an offset supporting head on one extremity of said shank to define an indicator casing accommodating offset disposed in parallel spaced relation to said elongated shank, confronting resilient fixed jaws on said head to extend substantially parallel to said elongated straight shank, said resilient fixed jaws being adapted to frictionally engage a horizontal stud to support said shank in a variety of rotative positions about the axis of said stud, and fixed resilient jaws at the other end of said elongated shank to support an indicator parallel to said shank.

7. An indicator mounting bracket comprising an elongated straight shank, an offset supporting head on one extremity of said shank to define an indicator casing accommodating offset disposed in parallel spaced relation to said elongated shank, confronting resilient fixed jaws on said head to extend substantially parallel to said elongated straight shank, said resilient fixed jaws being adapted to frictionally engage a horizontal stud to support said shank in a variety of rotative positions about the axis of said stud, fixed resilient threaded jaws at the other end of said elongated shank, a transversely extending post threadedly engaging said threaded jaws to support an indicator parallel to said shank.

8. An indicator mounting bracket comprising an elongated straight shank, an offset supporting head on one extremity of said shank to define an indicator casing accommodating offset disposed in parallel spaced relation to said elongated shank, confronting resilient fixed jaws on said head to extend substantially parallel to said elongated straight shank, said resilient fixed jaws being adapted to frictionally engage a horizontal stud to support said shank in a variety of rotative positions about the axis of said stud, fixed resilient threaded jaws at the other end of said elongated shank, a transversely extending post threadedly engaging said threaded jaws, and a split frictional ring on said post to support an indicator parallel to said shank.

CARL A. AKERT.

REFERENCES CITED

The following references are of record in the file of this patent:

UNITED STATES PATENTS

| Number | Name | Date |
|---|---|---|
| 1,299,838 | Keller | Apr. 8, 1919 |
| 2,185,838 | Duerr | Jan. 2, 1940 |
| 2,287,890 | Legassey | June 30, 1942 |